United States Patent Office 3,824,228
Patented July 16, 1974

3,824,228
OLIGOPEPTIDE DERIVATIVES AND PROCESS FOR THE PREPARATION THEREOF USING GLYCIDYL ESTERS OF CARBOXYLIC ACIDS TO REACT WITH PROTEIN-DIAMINE AMINOLYZATES
Hans Werner Eckert, Dusseldorf, and Peter Nikolaus, Dusseldorf-Holthausen, Germany, assignors to Henkel & Cie GmbH, Dusseldorf-Holthausen, Germany
No Drawing. Filed Oct. 2, 1972, Ser. No. 294,187
Claims priority, application Germany, Oct. 18, 1971, P 21 51 739.5
Int. Cl. C07g 7/00; C08h 1/00
U.S. Cl. 260—117    9 Claims

ABSTRACT OF THE DISCLOSURE

The invention relates to a process for the preparation of novel oligopeptide derivatives which can be used in hair conditioning and cosmetic preparations.

PRIOR ART

The aminolysis of proteins with di- or oligo-amines is known and produces mixtures of aminoamides which contain a low molecular weight polypeptide residue. For example, the aminolysis of proteins with ethylenediamine produces mixtures of the formula

in which Z is a peptide residue. The aminolysis of proteins with diethylenetriamine produces mixtures of components of the formula

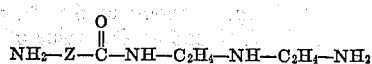

and

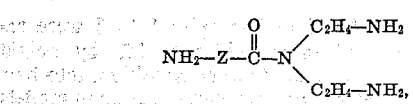

in which Z has the same meaning as above. Reaction products of such aminolyzates with fatty acids or methyl esters of fatty acid have been described as surface-active substances. Furthermore, oligopeptide derivatives are known as useful textile softeners, which are preparable by two-stage reaction of protein-aminolyzates with long-chain epoxides and subsequent acylation with fatty acids or fatty acid esters.

OBJECTS OF THE INVENTION

It is an object of the present invention to provide a process for the preparation of oligopeptide derivatives for use in hair cosmetic compositions comprising reacting (A) a protein aminolyzate consisting essentially of the reaction product of a protein with an amine selected from the group consisting of diamine with 2 to 10 carbon atoms and polyamine with 2 to 10 carbon atoms, with (B) a glycidyl ester of a carboxylic acid of the formula

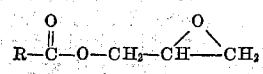

in which R is an aliphatic hydrocarbon having 9 to 23 carbon atoms; and recovering said oligopeptide derivatives; and the oligopeptide derivatives produced thereby.

These and other objects of the invention will become apparent as the description thereof proceeds.

DESCRIPTION OF THE INVENTION

The present invention provides a process for the preparation of oligopeptide derivatives for use in hair cosmetic compositions comprising reacting (A) a protein aminolyzate consisting essentially of the reaction product of a protein with an amine selected from the group consisting of diamine with 2 to 10 carbon atoms and polyamine with 2 to 10 carbon atoms, with (B) a glycidyl ester of a carboxylic acid of the formula

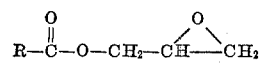

in which R is an aliphatic hydrocarbon having 9 to 23 carbon atoms; and recovering said oligopeptide derivatives. The present invention is also directed to the novel oligopeptide derivative produced by the above described process.

The protein-aminolyzates used as starting materials in the process according to the invention, may be derived from any vegetable or animal proteins, for example glue, gelatin, albumin, collagen, keratin, casein, protein derived from feathers, hair protein, cottonseed protein or soya protein. For the aminolysis of such proteins, diamines and/or polyamines with 2 to 10 carbon atoms are used. These amines are preferably those aliphatic amines having the formula:

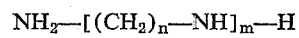

in which $n=2$ to 10 an $m=1$ to 5 with the proviso that the total number of carbon atoms does not exceed 10. Examples of these preferred aliphatic amines are ethylenediamine, 1,4-diaminobutane, diethylenetriamine, 1,6-diaminohexane, triethylenetetramine, or tetraethylenepentamine.

The aminolysis of the proteins with the above-mentioned diamines and/or polyamines may be effected in known way by heating the proteins with at least an equal amount by weight of diamine and/or polyamine under reduced pressure at temperatures between 80° and 200° C. until an aliquot part of the reaction mixture is soluble in dilute acid.

A preferred embodiment for carrying out the aminolysis, which leads to products with improved color quality, comprises adding an amount by weight of water, equal to or greater than the amount by weight of protein, to an amount by weight of diamine or polyamine which is equal to the weight of protein, heating the amine water mixture at 90° C. to 100° C. in a protective gas and then adding the protein. The temperature was then, also in presence of protective gas, raised to 150° C. As soon as the reaction product was soluble in acid, water and excess amine which might be present were removed under reduced pressure.

The molecular weights of the aminolyzates from proteins and the above-described diamines and/or polyamines generally lie in the range of 300 to 1000. Preferred starting substances for the process according to the invention are aminolyzates with a molecular weight lying in the range from 350 to 700.

The aminolyzates are then reacted with glycidyl esters of carboxylic acids of the general formula:

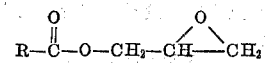

in which R signifies an aliphatic hydrocarbon containing 9 to 23 carbon atoms. The aliphatic hydrocarbon R may be a straight or branched chain and be saturated or unsaturated. Preferably R is a straight chained member selected from the group consisting of alkyl of 9 to 23 carbon atoms, alkenyl of 9 to 23 carbon atoms, alkadienyl of 9 to 23 carbon atoms, hydroyalkyl of 9 to 23 carbon atoms, hydroxalkenyl of 9 to 23 carbon atoms, alkatrienyl of 9 to 23 carbon atoms, and the mixtures thereof.

Examples of suitable glycidyl esters of naturally occurring fatty acids are, for example alkanoic acids of 10 to 24 carbon atoms such as capric acid, lauric acid, myristic acid, palmitic acid, stearic acid, arachidic acid, behenic acid, and lignoceric acid, alkenoic acids of 10 to 24 carbon atoms such as oleic acid and erucic acid, hydroxyalkanoic acids of 10 to 24 carbon atoms such as hydroxy-stearic acid, hydroxyalkenoic acids of 10 to 24 carbon atoms such as ricinoleic acid, alkadienoic acids of 10 to 24 carbon atoms such as linoleic acid, alkatrienoic acids of 10 to 24 carbon atoms such as linolenic acid, and the mixtures thereof, such as for example glycidyl esters of fatty acid fractions. Other suitable glycidyl ester reactants include the glycidyl ester of carboxylic acids such as 2-methyl-stearic acid and 1-undecenoic acid-11.

The relative proportions of the protein aminolyzate and the glycidyl ester of a carboxylic acid may vary within specified limits, depending on the type and molecular weight of the aminolyzate used. However, the range of 1 to 3 mol of glycidyl esters per mol of aminolyzate are preferable, since the products produced are more easily dispersible in water or water/alcohol mixtures.

The temperatures to be used lie in the range of 70° C. to 150° C. Basically the reaction may be carried out without use of a solvent. Since, however, the reaction is strongly exothermic and local overheating influences the color quality of the products, the addition of a solvent in which the aminolyzates are soluble or at least dispersible is preferable. Suitable solvents are, for example, lower alcohols and/or water.

The reaction may be carried out by adding the glycidyl ester portionwise to the aminolyzate heated to the desired reaction temperature, to which a solvent is optionally added, and thoroughly mixing the reaction material. After the termination of the glycidyl ester addition, heating and thorough mixing of the reaction mixture—possibly after increasing the temperature—is continued until epoxide oxygen is no longer detectable. The separation of the solvent, which may be present, may be effected by distillation before or during the period subsequent to the reaction.

The products are obtained in the form of a highly viscous mass, which on cooling, solidifies to solids of yellowish to brown color, depending on the reaction conditions. The products can be purified by recrystallization from acetone or similar solvents.

Since the aminoalcohol ester primarily formed in the reaction between glycidyl ester and aminolyzate undergoes a rearrangement during the reaction, which takes place according to known mechanism, the oligopeptide derivatives preparable according to the invention are probably 2,3 - dihydroxypropylcarboxylic acid amides. However, residues of aminoalcohol esters may also be present in the products.

The products preparable according to the invention are readily dispersible in water and water/alcohol mixtures. They are readily adsorbed on hair and show superior results with regard to general hair cosmetic activity than the protein hydrolyzates previously used for this purpose, and on the market such as may be obtained, for example, by alkaline hydrolysis or by enzymic decomposition of natural proteins.

The following examples are merely illustrative of the present invention without being deemed limitative in any manner thereof.

EXAMPLES

Protein-aminolyzate A

A mixture of 1 kg. of diethylenetriamine and 2 kg. of water was heated in a round-bottomed flask to 90° C. 1 kg. of gelatin was added with stirring during a period of half an hour, and then the reaction temperature was raised to 110° C. Water and excess amine were distilled off in vacuo. The protein-aminolyzate product was obtained in the form of a paste after the cooling thereof, and it had an average molecular weight of 385.

In an analogous manner using the same amounts of protein, amine and water at reaction temperatures of 100° to 150° C. (under nitrogen) the following aminolyzates were prepared:

Protein-aminolyzate B

Aminolysis product from casein and diethylenetriamine, average molecular weight M=550.

Protein-aminolyzate C

Aminolysin product from casein and tetraethylenepentamine, average molecular weight M=620.

EXAMPLE 1

116 g. (about 0.3 mol) of protein-aminolyzate A were heated with 60 ml. of water to 80° C. to 90° C., 162 g. (0.6 mol) of glycidyl laurate were added dropwise while vigorously stirring the mixture; and then the mixture was stirred at 80° C. to 90° C. for a further 3 hours. Afterwards water was distilled off in vacuo at 100° C.; and the reaction mixture was maintained for a further 3 hours at 120° C. The resulting yellowish melt solidified on cooling to a yellow solid, which had a total nitrogen content of 9.49% and an amino nitrogen content of 1.77%. The OH value of the product was 230.

EXAMPLE 2

Utilizing a procedure similar to Example 1, 106.5 g. (about 0.28 mol) of protein-aminolyzate A were reacted with 199 g. (0.56 mol) of glycidyl stearate. A yellow solid resulted with a total nitrogen content of 6.96%, an amino nitrogen content of 1.78% and an OH value of 195.

EXAMPLE 3

116 g. of protein-aminolyzate A (about 0.3 mol) were reacted with 212 g. (0.6 mol) of glycidyl oleate by the method according to Example 1. The resulting yellow solid had a total nitrogen content of 6.45%, an amino nitrogen content of 2.03% and an OH value of 220.

EXAMPLE 4

The products produced in Examples 1 to 3 were respectively incorporated in quantities of 1% by weight based upon the weight of the total composition, into hair treatment mixtures of known composition. Human models with hair of damaged structure were chosen for the test series. The hair was washed, brushed and parted in the center. Then the preparation of the present invention was applied to one half of the head and a comparative prior art preparation was applied to the other half of the head. After a treatment time of 15 minutes, the hair was rinsed out with warm water, brushed and the body of the hair and the wet combability of the hair were judged by 6 skilled persons. Then the hair was wound on rollers, dried and, after removal of the rollers, the firmness and springiness of the curls were judged by the same persons. It was found that the preparations having additions of the compounds according to Examples 1 to 3 substantially improved the body of the hair and the wet combability of the hair. The hair dried on rollers was firmer and the curls had an improved elasticity. The results were distinctly superior to those with the comparative preparations, which contained simple protein hydrolyzates (trade names WSP X 1000, WSP X 250) in the same amount.

Analogous results could be obtained with reaction products from protein-aminolyzate B and glycidyl esters of myristic acid, palmitic acid, behenic acid or erucic acid as well as with reaction products from protein-aminolyzate C with glycidyl esters of lauric acid, oleic acid or myristic acid.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:
1. A process for the preparation of oligopeptide derivatives for use in hair cosmetic compositions comprising reacting at a temperature in the range of 70° C. to 150° C. (A) a protein-aminolyzate consisting essentially of the reaction product of a protein with an amine selected from the group consisting of diamine with 2 to 10 carbon atoms and polyamine with 2 to 10 carbon atoms, with (B) a glycidyl ester of a carboxylic acid of the formula

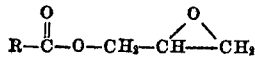

in which R is an aliphatic hydrocarbon having 9 to 23 carbon atoms; and recovering said oligopeptide derivatives.

2. The process of claim 1, in which the protein-aminolyzate of (A) has a molecular weight in the range of 300 to 1000.

3. The process of claim 1, in which the molar ratio of reactant (A) to reactant (B) is 1:1 to 3.

4. The process of claim 1, in which the amine of (A) is an aliphatic amine of the formula

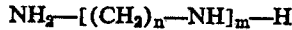

in which
$n$ is an integer from 2 to 10
$m$ is an integer from 1 to 5 with the proviso that the total number of carbon atoms does not exceed 10.

5. The process of claim 1, in which R is selected from the group consisting of alkyl of 9 to 23 carbon atoms, alkenyl of 9 to 23 carbon atoms, alkadienyl of 9 to 23 carbon atoms, alkatrienyl of 9 to 23 carbon atoms, hydroxyalkyl of 9 to 23 carbon atoms, hydroxy alkenyl of 9 to 23 carbon atoms, and the mixtures thereof.

6. The process of claim 1, in which the protein-aminolyzate of (A) has a molecular weight in the range of 350 to 700.

7. The process of claim 1, in which the natural protein is selected from the group consisting of glue, gelatin, albumin, collagen, keratin, caesin, protein derived from feathers, hair protein, cottonseed protein and soya protein.

8. The process of claim 1, in which the aliphatic amine is selected from the group consisting of ethylenediamine, 1,4 - diaminobutane, diethylenetriamine, 1,6 - diaminohexane, triethylenetetramine, and tetraethylenepentamine.

9. An oligopeptide derivative produced by the process of claim 1.

References Cited

Chem. Abstracts, Vol. 75, 1971, 99227N, Eckert, et al., effective date Mar. 6, 1971.

HOWARD E. SCHAIN, Primary Examiner

U.S. Cl. X.R.

260—112 R, 119, 121, 123.5, 123.7; 424—71